Figure 1:
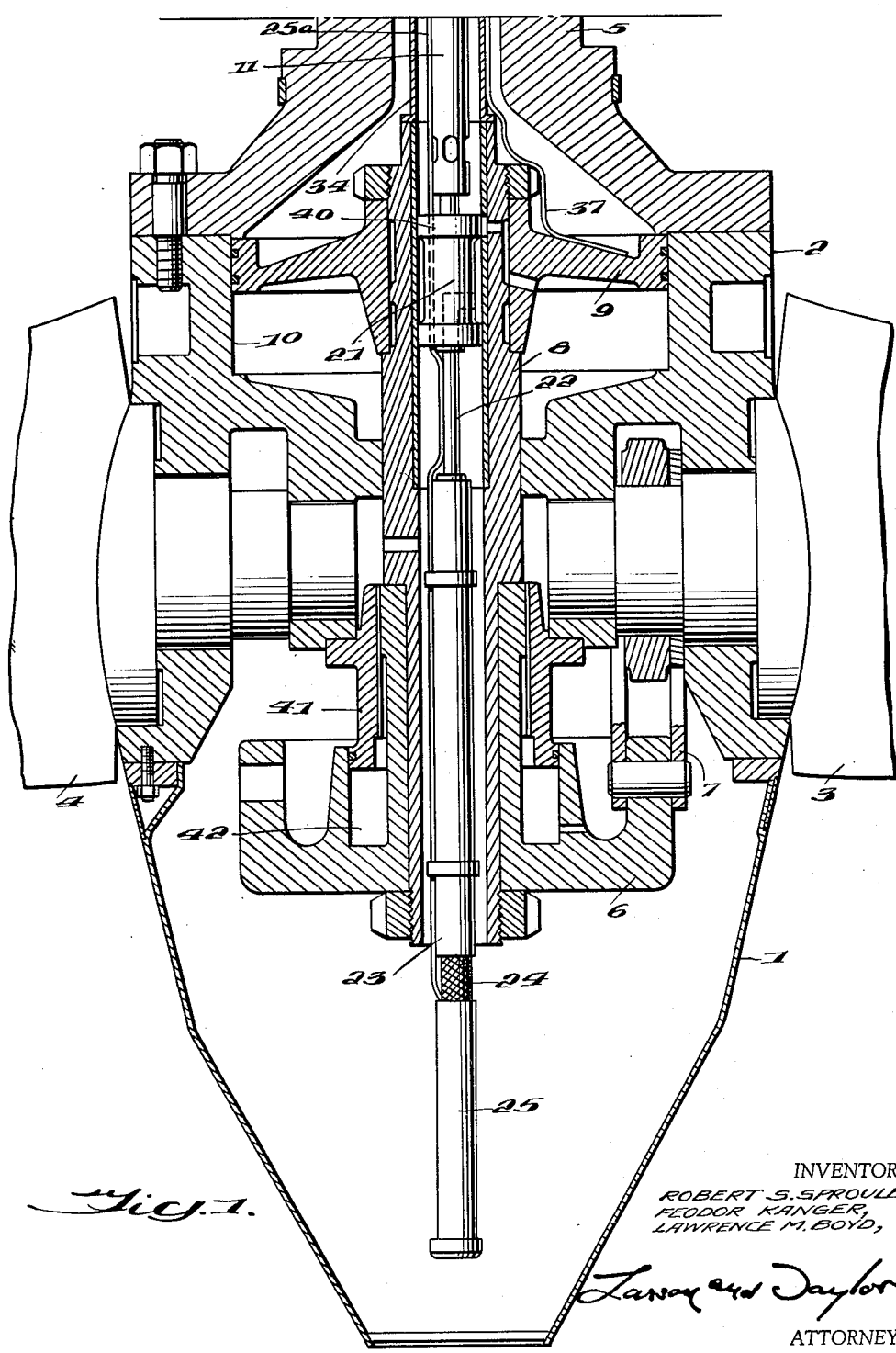

INVENTORS
ROBERT S. SPROULE,
FEODOR KANGER,
LAWRENCE M. BOYD,

ATTORNEYS

INVENTORS
ROBERT S. SPROULE,
FEODOR KANGER,
LAWRENCE M. BOYD,

Lanson and Taylor
ATTORNEYS

United States Patent Office 3,146,991
Patented Sept. 1, 1964

3,146,991
DOUBLE ACTING PIPELESS RUNNER BLADE
SERVO WITH AIR BIAS FOR FAST OPENING
Robert S. Sproule, Montreal, Quebec, Lawrence M. Boyd,
Senneville, Quebec, and Feodor Kanger, Cote St. Luc,
Quebec, Canada, assignors to Dominion Engineering
Works Limited, Montreal, Quebec, Canada
Filed June 15, 1961, Ser. No. 117,381
3 Claims. (Cl. 253—31)

This invention relates to hydraulic turbines and pumps and more particularly to a runner blade servo system for Kaplan type turbines wherein the runner blades may be rapidly moved to an open position by means of an air compressor.

In co-pending application Serial No. 108,814, filed May 9, 1961, there is disclosed a conventional Kaplan type turbine runner blade servo system together with an improved system wherein the actuating mechanism for shifting the angular position of the runner blades is housed within the rotating assembly. The advantages of such an improved system in eliminating the piping and rotary seals of conventional Kaplan turbines are adequately brought out in the aforementioned patent application. There is, however, a disadvantage in such an improved system in rapidly meeting changes in the power demands of the generator.

The power demands of a generator may vary instantaneously and it is, of course, desirable that the turbine accept the change in load requirements rapidly. A comparatively large fast acting servo mechanism may be utilized to control the wicket gate movements. However, space requirements limit the size of the servo motor which may be utilized to control the runner blade movements when the actuating mechanism is housed within the rotating assembly as disclosed in the aforementioned patent application. When a decreased power requirement arises, the rapidly moving wicket gates may themselves provide the prompt response necessary to properly adjust the turbine to this decreased power requirement and the slower response of the runner blades to a more closed position is not of consequence. However, an increased load may be met by the turbine only by the proper adjustment of both the wicket gates and runner blades to the more open position and hence the slower moving runner blades determine the time within which the turbine adjusts to the increased load.

In patent application Serial No. 109,717, filed May 12, 1961, the foregoing disadvantages are overcome in certain applications of the turbine by utilizing the hydrodynamic force acting against the runner blades and tending to move the blades to an open position. Means is provided whereby upon an increased power demand this force will rapidly move the runner blades to the desired more open setting in accordance with the wicket gate setting.

However, in certain application of the turbine there is insufficient blade torque bias to shift the blade to the open position. Under such circumstances the apparatus described in application Serial No. 109,717 will not function to properly adjust the angle of the runner blades in response to an increased power demand.

The present invention overcomes the aforementioned disadvantage by providing a mechanical bias which is provided by the blade actuator. According to the present invention the rotating assembly of the turbine includes a casing with the runner blades rotatably journalled therein, the rotating assembly including a servo motor operatively connected to the runner blades, a pump and means for driving the pump. The casing itself may constitute the reservoir for the pump. In these respects the structure is similar to the structure disclosed in the co-pending application hereinbefore referred to. However, according to the present invention the servo motor and control valve means is adapted to drive the runner blades toward a closed position only and therefore only one end of the piston and cylinder assembly comprising the servo motor is controlled by the servo system. The other end of the piston and cylinder assembly is connected to a compressed air source so that a constant pressure is applied to the piston to move the runner blades to an open position. This constant air pressure is constant only for specific values of hydraulic head and will be varied to suit seasonal changes in hydraulic heads. Thus, when the control valve is moved to connect the other end of the piston and cylinder assembly to the reservoir, the compressed air acting against the piston will move the runner blades quickly to a more open position. In this manner a very rapid response to an increased power requirement is achieved where there is insufficient torque acting against the runner blades to move the blades to an open position. These results are achieved without increasing the size of the runner blade servo system or sacrificing the advantages gained by disposing the system within the rotating assembly.

A primary object of the present invention is to provide in a runner blade servo system disposed within the rotating assembly of a turbine means for achieving a rapid response to increased power requirements where there is insufficient torque bias on the blades due to hydrodynamic force to move the blades to an open position.

Another object of the present invention is to provide in a runner blade servo system disposed within the rotating assembly of a turbine a single acting servo motor for driving the runner blades towards a closed position and means for applying a constant bias depending upon hydraulic head condition tending to rotate the blades to a more open position.

Figure 2:
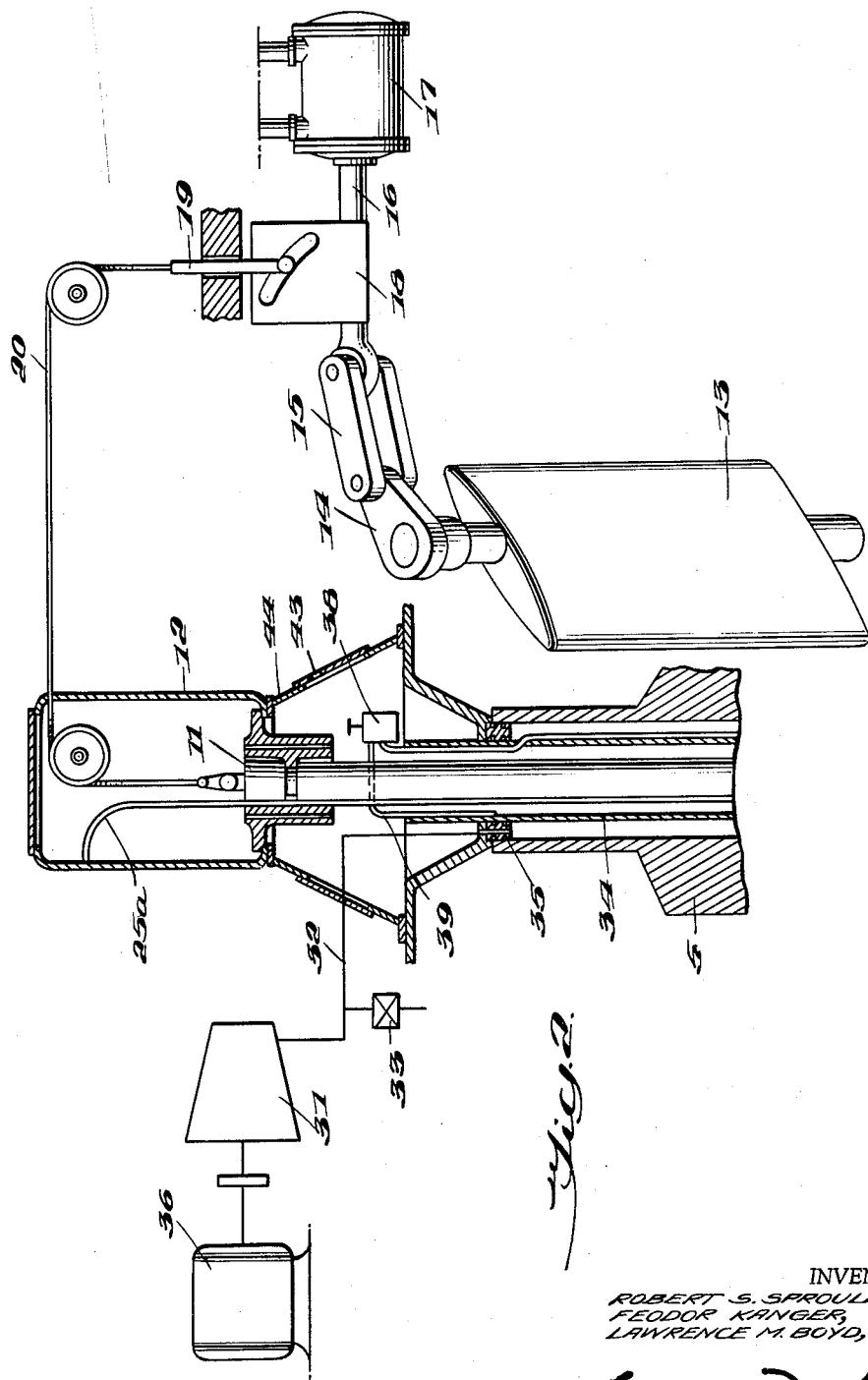
Figure 3:
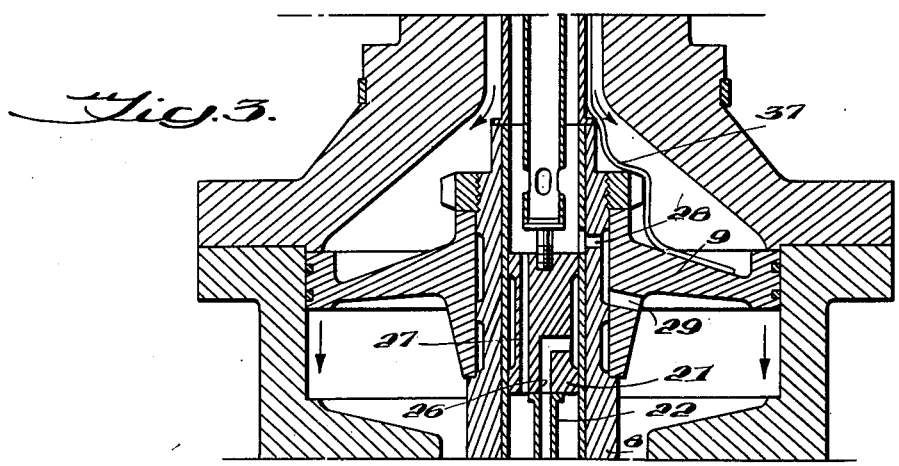
Figure 4:
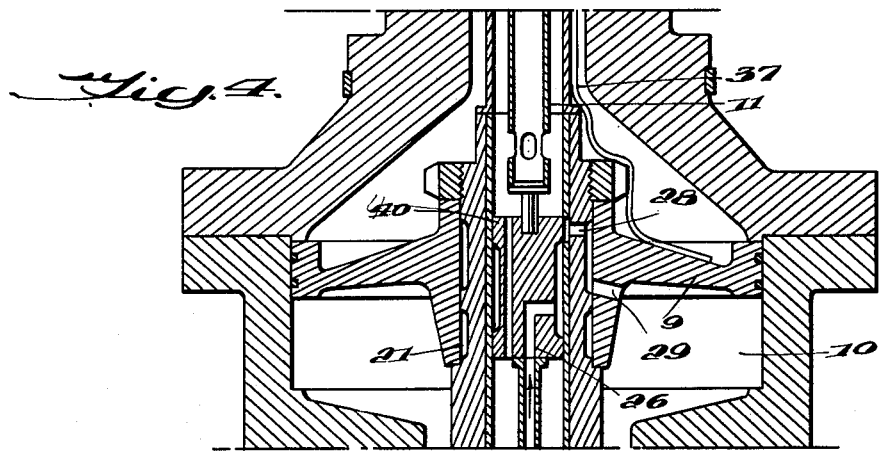
Figure 5:
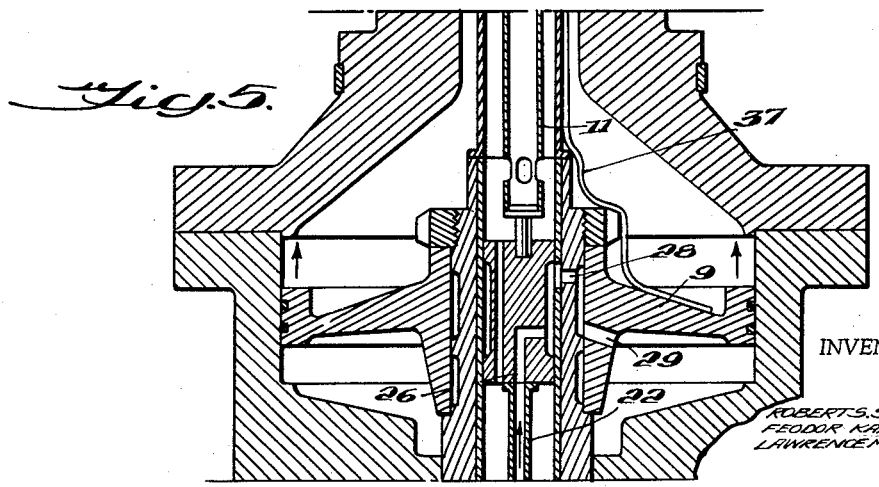

Other objects and many of the attendant advantages of the present invention will become more readily apparent upon consideration of the following detailed specification in connection with the accompanying drawings wherein:

FIG. 1 is an elevational view partly in section of a portion of the runner blade control system according to the present invention, FIG. 2 is a view partly in section of another portion of the runner blade control system, FIG. 3 is a sectional view showing the control valve in position to shift the blade actuating piston downwards to open the blades, FIG. 4 is a sectional view showing the control valve and piston in equilibrium and, FIG. 5 is a sectional view showing the control valve in position to shift the blade actuating piston upwards to close the blades.

Referring now more specifically to the drawings wherein like numerals indicate like parts throughout the several views there is shown at 1 in FIG. 1 a rotatable casing structure including a hub 2, the hub providing means to rotatably journal runner blades 3 and 4. A hollow shaft 5 extends from the rotatable casing and this shaft drives the rotor of a generator (not shown). The runner blades are driven by water fed thereto through a casing (not shown) surrounding the runner blades. A plurality of wicket gates are mounted within this casing and the angular position of these wicket gates is set in accordance with the power demand on the turbine. It has been found that the turbine runs more smoothly and efficiently when the runner blades are set at a specific angular position for each angular position of the wicket gates.

The runner blades are rotatably journalled in the hub 2 of the rotatable casing structure and are connected with a crosshead 6 by means of links such as shown at 7 interconnecting runner blade 3 with the crosshead 6. The linkage interconnecting the runner blade 4 with crosshead 6 is not shown for the sake of clarity but it will be understood that each of the runner blades is operatively connected with the crosshead 6 in such a manner that movement of the crosshead along the longitudinal axis of the casing structure 1 will cause simultaneous movement of the runner blades.

The crosshead 6 is connected with a piston rod 8 which has the upper end thereof fixed to a piston 9 slidable within a cylinder 10. It can be readily appreciated that the piston and crosshead are interconnected so that movement of the piston will produce corresponding movement of the crosshead and hence vary the angular position setting of the runner blades. The piston 9 and cylinder 10 comprise a servo motor controlled by a valve mechanism and rod 11 which extends upwardly through the generator (not shown) to a fixed casing 12, FIG. 2.

In FIG. 2 there is shown a wicket gate 13 which is connected by links 14 and 15 with the piston rod 16 of a servo motor 17. The piston rod 16 has mounted thereon a cam 18 and this cam is provided with a cam follower 19 connected with control cable 20 which is secured to the upper end of control rod 11. A suitable power source supplying hydraulic fluid to either end of servo motor 17 drives the piston rod in either direction to determine the angular setting of wicket gate 13. Through the cam and cam follower the control rod 11 will position the valve means so that the runner blades will be shifted to a predetermined position corresponding to the setting of the wicket gates as will appear more clearly hereinafter.

The lower end of the control rod 11 has a spool shaped valve body 21 mounted thereon and a hydraulic pressure pipe 22 interconnects the spool valve with a pump 23. The pump 23 has an inlet 24 as shown and is driven by a motor 25 having current supplied thereto through electric cable 25a.

The spool valve 21 is shown in section in FIG. 3 and it can be seen that the hydraulic pressure pipe 22 communicates with duct 26 within the spool valve. The valve body is provided with a return passageway 27. A port 28 is provided in the piston rod 8 and a duct 29 connects port 28 with one side of the piston 9.

The other side of the piston 9 and the upper end of the cylinder 10 is connected with a compressor 31 (FIG. 2) through an air pressure line 32. The specific air pressure within the line 32 and acting against the upper side of the piston 9 is controlled by a valve 33. A tube 34 extends from the upper end of the piston rod 8 to a position within the casing assembly at the upper end of the turbine. This tube seals off the hydraulic system and control rod 11 from the compressed air system. Seals 35 are disposed between the shaft 5 and the tubular member 34 so as to seal off the chamber comprising the space above the piston 9 and between the tube 34 and shaft 5. The compressor may be driven by means of a motor 36.

In order to prevent the accumulation of oil on the upper side of piston 9 a tube 37, open at its lower end, which is close to the upper surface of the piston 9 extends upwardly to a throttling device 38 which has the exit pipe thereof extending to within the tube 34 so that any oil disposed on the upper surface of the piston 9 will be passed upwardly through the throttling device and into the oil reservoir within tube 34. Any air within the pipe 37 may escape by way of a vent 43 within the upper chamber 44.

The operation of the presently disclosed system will now be described. In FIG. 4 the parts are shown in an equilibrium position. The control rod 11 positions the spool valve 21 so that the land 40 thereon covers the port 28. Thus, the hydraulic fluid positioned within the cylinder 10 beneath the piston 9 is completely closed off.

The compressor 31 furnishes a constant pressure for specific hydraulic head conditions acting against the upper surface of the piston 9.

When there is an increased power demand on the turbine the wicket gates such as shown at 13 in FIG. 2 are moved to a more open position. Because of the size of the servo motor 17 actuating these wicket gates a relatively fast movement of the gates can be achieved. It can be seen that opening movement of the wicket gates 13 will cause lowering of the control rod 11 so that the land 40 on the spool valve will be uncovered and moved to the position shown in FIG. 3 wherein hydraulic fluid is permitted to pass from beneath the piston 9 through duct 29, port 28, and return passageway 27. When the control rod is in this position the compressed air acting against the upper surface of the piston 9 forces the piston 9 and piston rod 8 downwardly until the port 28 is again covered by the land on the control valve 21. This movement of the piston rod will move the runner blades to a more open position through the links 7 interconnecting the crosshead with the runner blades.

When the wicket gates are moved to a more closed position the control rod 11 is shifted upwardly as shown in FIG. 5 so that the land on spool valve 21 uncovers port 28 and interconnects ducts 29 and 26. In this position of the valve 21 hydraulic fluid will be pumped through the hydraulic pressure pipe 22, duct 26, port 28, and duct 29 to the lower side of piston 9. The piston will move upwardly as viewed in FIG. 5 against the pressure of the compressed air to shift the runner blades towards a closed position. It can be readily seen that the piston will move upwardly until the port 28 is completely covered by the land on valve spool 21 whereupon a condition of equilibrium will again exist.

Referring to FIG. 1 there can be seen a dashpot comprising piston 41 and cylinder 42 to restrict the rate of movement of the blades in a closing direction.

The compressed air acting against the upper side of the piston 9 provides a means for rapidly moving the runner blades to an open position in response to an increased power demand on the generator. The hydraulic servo mechanism provides a completely adequate means to shift the blades towards a closed position and achieves all of the advantages of a system which is completely encased within the rotating part of the turbine as outlined in the co-pending application referred to hereinbefore.

Obviously many modifications and variations of the present invention are possible in light of the above teachings. What is claimed as new and desired to be secured by Letters Patent is:

1. In a Kaplan type turbine including adjustable wicket gates and wicket gate operating mechanism for changing the setting of the wicket gates to control the flow of water to turbine runner blades, a rotating assembly including a rotatable shaft, a casing rigidly secured to said shaft, a liquid reservoir disposed within said casing, runner blades journalled in said casing for rotation about axes radial to the casing, and means for shifting the angular positions of said runner blades to predetermined positions relative to the positions of said wicket gates, said means being disposed in said casing and comprising a pump and hydraulic servo motor means including a piston and cylinder assembly, means connecting said piston with said runner blades, control valve means for connecting one side of said piston selectively with the reservoir and the output of said pump, means including a compressor for supplying air pressure acting against the other side of said piston, said last named means supplying a constant bias urging said runner blades to open position, whereby said servo motor drives said runner blades to closed position when said control valve means connects the one side of said piston with the output of said pump and the air pressure acting against the other side of said piston moves said runner blades to open position when said control valve means connects the one side of said piston with the reservoir.

2. In a turbine according to claim 1 and further including a dashpot including a cylinder fixed with respect to the casing and a second piston movable with said first named piston for cushioning the movement of the runner blades to closed position.

3. In a turbine according to claim 1 further including means for removing from the upper surface of said piston oil which has accumulated thereon, said means comprising a tube and throttling means.

References Cited in the file of this patent

UNITED STATES PATENTS

| | | |
|---|---|---|
| 1,663,513 | Howse | Mar. 20, 1928 |
| 1,858,566 | Terry | May 17, 1932 |
| 1,893,612 | Caldwell | Jan. 10, 1933 |
| 2,255,920 | Englesson | Sept. 16, 1941 |
| 2,304,153 | DiCesare | Dec. 8, 1942 |
| 2,518,925 | Nussbaum | Aug. 15, 1950 |
| 2,593,910 | Morris et al. | Apr. 22, 1952 |

FOREIGN PATENTS

| | | |
|---|---|---|
| 703,319 | Germany | Mar. 6, 1941 |
| 757,575 | Great Britain | Sept. 19, 1956 |